United States Patent
Funkhouser

(10) Patent No.: US 8,739,871 B2
(45) Date of Patent: Jun. 3, 2014

(54) THERMALLY-ACTIVATED, HIGH TEMPERATURE PARTICULATE SUSPENDING AGENTS AND METHODS RELATING THERETO

(71) Applicant: Halliburton Energy Services, Inc., Houston, TX (US)

(72) Inventor: Gary P. Funkhouser, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 97 days.

(21) Appl. No.: 13/622,005

(22) Filed: Sep. 18, 2012

(65) Prior Publication Data

US 2014/0076565 A1    Mar. 20, 2014

(51) Int. Cl.
*E21B 33/13* (2006.01)
*E21B 43/04* (2006.01)
*E21B 43/22* (2006.01)
*C09K 8/035* (2006.01)
*C09K 8/42* (2006.01)

(52) U.S. Cl.
USPC ........ 166/278; 166/279; 166/280.1; 166/293; 166/300; 507/267; 507/903

(58) Field of Classification Search
None
See application file for complete search history.

(56) References Cited

U.S. PATENT DOCUMENTS

| | | |
|---|---|---|
| 7,140,438 B2 | 11/2006 | Frost et al. |
| 7,572,755 B2 | 8/2009 | Miller et al. |
| 7,757,766 B2 | 7/2010 | Lewis et al. |
| 7,902,128 B2 | 3/2011 | Zhang et al. |
| 2005/0274519 A1 | 12/2005 | Chatterji et al. |
| 2010/0292109 A1 | 11/2010 | Moradi-Araghi et al. |

FOREIGN PATENT DOCUMENTS

| | | |
|---|---|---|
| EP | 1 074 598 A1 | 2/2001 |
| EP | 1 086 935 A2 | 3/2001 |
| EP | 1 086 935 A3 | 3/2001 |
| GB | 1118621 | 7/1968 |
| JP | 2007261921 A | 10/2007 |
| WO | 2014046953 A1 | 3/2014 |

OTHER PUBLICATIONS

Yuan et al., "PEG-Detachable and Acid-Labile Cross-linked Micelles Based on Orthoester Linked Graft Copolymer for Paclitaxel Release," 2011 Nanotechnology 22 335601.
Halliburton Brochure, "AccuBreaksm Service, Chemical "Switch" Provides Controlled Acid Releaser to Help Eliminate Post-Completion Pipe Trips and Interventions," 2011.
International Search Report and Written Opinion for PCT/GB2012/000399 dated Sep. 11, 2012.

*Primary Examiner* — Zakiya W Bates
(74) *Attorney, Agent, or Firm* — McDermott Will & Emery LLP; Craig W. Roddy

(57) ABSTRACT

A particulate suspending agent may be useful for mitigating particulate settling in wellbore applications with high-temperature and/or at near-neutral and higher pH values. Methods of treating a wellbore may include providing a treatment fluid comprising an aqueous liquid, a plurality of particulates, and a particulate suspending agent, wherein the particulate suspending agent comprises a crosslinked polymer particulate formed by a reaction comprising a first monofunctional monomer and an orthoester crosslinker, the orthoester crosslinker comprising an orthoester linkage and at least two crosslinking moieties; and placing the treatment fluid in a wellbore penetrating a subterranean formation.

20 Claims, No Drawings

THERMALLY-ACTIVATED, HIGH TEMPERATURE PARTICULATE SUSPENDING AGENTS AND METHODS RELATING THERETO

BACKGROUND

The present invention relates to particulate suspending agents for use in high-temperature and/or at near-neutral or higher pH (e.g., greater than about 5) wellbore applications, and methods relating thereto.

Subterranean operations often involve fluids that include particulates. For example, cement slurries include hydraulic cement particulates, and drilling fluids often include particulate weighting agents. To maintain particulates in suspension, the fluids are often viscosified. As the bottom hole circulating temperature of a wellbore increases, the viscosity of a fluid decreases, which is known as thermal thinning, which can cause undesirable settling of the particulates from the fluid.

Particulate settling can cause the density of the fluid to change, which can lead to, inter alia, an influx of formation fluids. To inhibit settling, suspending agents, e.g., crosslinked polymers, can be added to fluids. As the fluid temperature increases, the suspending agent is thought to increase the viscosity of the fluid, for example, by breaking crosslinks to release a polymer into the fluid. One important feature of a suspending agent is that it not adversely affect low-temperature rheology.

Existing suspending agents, e.g., guar or guar derivatives crosslinked with borate, delay crosslink breakage sufficiently to allow mixing and pumping of a fluid without imparting an excessively-high viscosity. However, existing suspending agents are known to degrade above 300° F. This temperature limitation makes these suspending agents more impractical for use in higher temperature applications. Synthetic polymers crosslinked with esters or amides are effective at temperatures in excess of 400° F., but the crosslinks may not be degraded rapidly enough at near-neutral pH values (e.g., about pH 5 to about pH 8) to offset thermal thinning as the fluid heats up in the wellbore.

SUMMARY OF THE INVENTION

The present invention relates to particulate suspending agents for use in high-temperature and/or at near-neutral or higher pH (e.g., greater than about 5) wellbore applications, and methods relating thereto.

One embodiment of the present invention provides for a method that comprises providing a treatment fluid comprising an aqueous liquid, a plurality of particulates, and a particulate suspending agent, wherein the particulate suspending agent comprises a crosslinked polymer particulate formed by a reaction comprising a first monofunctional monomer and an orthoester crosslinker, the orthoester crosslinker comprising an orthoester linkage and at least two crosslinking moieties; and placing the treatment fluid in a wellbore penetrating a subterranean formation.

Another embodiment of the present invention provides for a method that comprises providing a treatment fluid comprising an aqueous liquid, a plurality of particulates, and a particulate suspending agent, wherein the particulate suspending agent comprises a crosslinked polymer particulate that comprises a polymer crosslinked with an orthoester crosslinker that comprises an orthoester linkage and at least two crosslinking moieties; placing the treatment fluid in a wellbore penetrating a subterranean formation with a bottom hole static temperature of about 150° F. or greater; and allowing the orthoester linkage to degrade thereby allowing at least some of the polymer to dissolve and suspend the particulates.

Yet another embodiment of the present invention provides for treatment fluid that comprises an aqueous fluid, a plurality of particulates, and a particulate suspending agent comprising a crosslinked polymer particulate, wherein the crosslinked polymer particulate is produced from a reaction comprising: a first monofunctional monomer, and an orthoester crosslinker that comprises an orthoester linkage and at least two crosslinking moieties.

Another embodiment of the present invention provides for a method of producing a particulate suspending agent, such that the method comprises providing an oil solution comprising an oil-based solvent and a surfactant; providing a monomer mixture comprising an aqueous liquid and a first monofunctional monomer; forming an inverse suspension with the monomer mixture and the oil solution; reacting the monomer mixture in the inverse suspension with a free-radical initiator to form a polymer particulate; isolating the polymer particulate; and diffusing an orthoester crosslinker into the polymer particulate so as to form a crosslinked polymer particulate.

The features and advantages of the present invention will be readily apparent to those skilled in the art upon a reading of the description of the preferred embodiments that follows.

DETAILED DESCRIPTION

The present invention relates to particulate suspending agents for use in high-temperature and/or at near-neutral or higher pH (e.g., greater than about 5) wellbore applications, and methods relating thereto.

Of the many advantages of the present invention, the present invention provides compositions that protect against thermal thinning at elevated temperatures of fluids comprising particulates (e.g., hydraulic cements, weighting agents, proppants, and the like), and methods relating thereto. The present invention provides particulate suspending agents that are useful in subterranean formations that have bottom hole static temperatures (BHST) of 150° F. or greater, including those formations that have a bottom hole static temperature in excess of about 400° F. Further, the particulate suspending agents may be useful in fluids having a pH of about 5 or greater. Thus, the applicability of the particulate suspending agents of the present invention is able to provide needed particle suspension at a significantly higher temperature range and a higher pH range than other known particulate suspending agents.

The particulate suspending agents of the present invention are designed to minimally affect the low-temperature (e.g., ambient temperature) viscosity of a treatment fluid. Additionally, the particulate suspending agents of the present invention may be applicable to a wide variety of subterranean formations and/or wellbore treatments where a particulate suspending aid is needed in high temperature applications, including in cementing fluids, spacer fluids, flush fluids, and fracturing fluids. When used in cementing fluids, the particulate suspending agents may not adversely affect the setting time of a hydraulic cement or the final strength of the set cement.

It should be noted that when "about" is used herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, a treatment fluid described herein may comprise an aqueous liquid, a plurality of particulates, and a particulate suspending agent that comprises a plurality of crosslinked polymer particulates that include a polymer that comprises a first monofunctional monomer and optionally a second monofunctional monomer, the polymer being crosslinked with an orthoester crosslinker that comprises an orthoester linkage and at least two crosslinking moieties (e.g., amine and/or vinyl groups). In some embodiments, the crosslinked polymer particulate may be formed by a reaction comprising a first monofunctional monomer, an orthoester crosslinker that comprises an orthoester linkage and crosslinking moieties, and optionally a second monofunctional monomer. It should be understood that the term "particulate" as used in this disclosure, includes all known shapes of materials, including, but not limited to, spherical materials, substantially spherical materials, low to high aspect ratio materials, fibrous materials, polygonal materials (such as cubic materials), and mixtures thereof.

In some embodiments, when the temperature in the wellbore exceeds the temperature at which the orthoester crosslinker hydrolyzes, the crosslinker may hydrolyze thereby enabling the polymer to dissolve in the treatment fluid, the polymer comprising the first monofunctional monomer and optionally the second monofunctional monomer. In some embodiments, the polymer dissolved in the treatment fluid may inhibit settling of a particulate suspended in the treatment fluid.

Monofunctional monomers suitable for use in conjunction with forming crosslinked polymer particulates described herein may, in some embodiments, be a monomer containing a vinyl or vinylidene group that is stable in a polymerized and/or crosslinked form at a high temperature, i.e., above 150° F. As used herein, "stable" refers to substantially non-degradable on the timescale of the performance requirement. Suitable monofunctional monomers may include, but are not limited to, acrylamide, N-substituted acrylamides, N,N-disubstituted acrylamides, N-vinylamides, N-alkyl-N-vinylamides, N,N-dimethylacrylamide, sodium 2-acrylamido-2-methylpropanesulfonate, 2-acrylamido-2-methylpropanesulfonic acid, N-(hydroxymethyl)acrylamide, N-(hydroxyethyl)acrylamide, acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, N-vinylacetamide, acrylic acid, sodium 4-styrenesulfonate, vinylsulfonic acid, and any derivative thereof. It should be noted that, in some embodiments, a mixture of monofunctional monomers may also be useful in conjunction with forming crosslinked polymer particulates described herein.

In some embodiments, a crosslinked polymer particulate described herein may be formed from a reaction that comprises a first monofunctional monomer and a second monofunctional monomer. A ratio of first monofunctional monomer to second monofunctional monomer may, in some embodiments, be present in the reaction in an amount ranging from a lower limit of about 0.1:99.9, 1:99, 5:95, 10:90, 25:75, or 50:50 to an upper limit of about 99.9:0.1, 99:1, 90:10, 75:25, or 50:50, and wherein the amount may range from any lower limit to any upper limit and encompass any subset therebetween.

Orthoester crosslinkers suitable for use in conjunction with forming crosslinked polymer particulates described herein may, in some embodiments, comprise an orthoester linkage and at least two crosslinking moieties (e.g., amine or vinyl groups). Examples of orthoester crosslinkers include, but are not limited to, 2-(5-amino-1,3-dioxan-2-yloxy)triethoxy-1,3-dioxan-5-ylamine, divinyl ethyl orthoacetate, and any derivative thereof.

In some embodiments, orthoester crosslinkers suitable for use in conjunction with forming crosslinked polymer particulates described herein may be hydrolytically stable at ambient temperatures and hydrolytically unstable at high temperatures, i.e., above 150° F., on the timescale of the well treatment. As used herein, "hydrolytically stable," and any derivative thereof, indicates stable against hydrolysis. In some embodiments, orthoester crosslinkers suitable for use in conjunction with forming crosslinked polymer particulates described herein may hydrolyze at temperatures ranging from a lower limit of about 100° F., 150° F., 175° F., or 200° F. to an upper limit of about 250° F. or 225° F., and wherein the temperature may range from any lower limit to any upper limit and encompass any subset therebetween.

In some embodiments, orthoester crosslinkers suitable for use in conjunction with forming crosslinked polymer particulates described herein may be hydrolytically unstable on the timescale of the well treatment at elevated temperatures in conjunction with a pH greater than about 5. In some embodiments, orthoester crosslinkers suitable for use in conjunction with forming crosslinked polymer particulates described herein may be chosen to hydrolyze rapidly, e.g., at temperatures greater than about 150° F. in conjunction with a pH value ranging from a lower limit of about 5 to an upper limit of about 8, including any subset therebetween. For example, in some embodiments, rapid hydrolysis may be advantageous in treatment fluids like spacers.

In some embodiments, orthoester crosslinkers suitable for use in conjunction with forming crosslinked polymer particulates described herein may be chosen to hydrolyze slowly, e.g., at temperatures greater than about 150° F. in conjunction with a pH value greater than about 8. For example, in some embodiments, slow hydrolysis may be advantageous in treatment fluids like drilling fluids and fracturing fluids.

In some embodiments, the pH value of the treatment fluid may be intentional or as a consequence of the additives therein (e.g., weighting agents described herein).

In some embodiments, orthoester crosslinkers described herein may be present in the reaction to form a crosslinked polymer particulate in an amount ranging from a lower limit of about 0.1%, 0.5%, 1%, 5%, or 10% by weight of total monomer to an upper limit of about 20%, 15%, 10%, 5%, or 1% by weight of total monomer, and wherein the amount may range from any lower limit to any upper limit and encompass any subset therebetween.

In some embodiments, the particulate suspending agents may be used in a treatment fluid comprising a particulate, wherein the particulate needs to be maintained in suspension at temperatures greater than about 150° F., 175° F., 200° F., 225° F., 275° F., 300° F., 325° F., 350° F., 400° F., or 450° F.

Particulates suitable for use in conjunction with the particulate suspending agents of the present invention may, in some embodiments, be any particulate suitable for use in a subterranean formation including, but not limited to, hydraulic cement, weighting agents, proppants, fine aggregate particulates, hollow glass spheres, and the like, and any combination thereof.

Particulates suitable for use in conjunction with the particulate suspending agents of the present invention may, in some embodiments, have a diameter ranging from a lower limit of about 0.5 μm, 1 μm, 10 μm, 50 μm, 0.1 mm, or 1 mm to an upper limit of about 10 mm, 1 mm, 0.5 mm, 0.1 mm, or 50 μm, and wherein the diameter may range from any lower limit to any upper limit and encompass any subset therebetween.

Particulates suitable for use in conjunction with the particulate suspending agents of the present invention may, in some embodiments, be present in a treatment fluid in an amount ranging from a lower limit of about 10%, 20%, 30%, 40%, or 50% by weight of treatment fluid to an upper limit of about 90%, 80%, 70%, 60%, 50%, or 40% by weight of treatment fluid, and wherein the amount may range from any lower limit to any upper limit and encompass any subset therebetween.

The terms "cement" and "hydraulic cement" may be used interchangeably in this application. As used herein, the terms refer to compounds and/or particulates of a cementitious nature that set and/or harden in the presence of water. Hydraulic cements suitable for use in conjunction with the particulate suspending agents of the present invention may, in some embodiments, be any known hydraulic cement including, but not limited to, Portland cements (e.g., API classes A, B, C, G, and H), slag cements, pozzolana cements, gypsum cements, aluminous cements, silica cements, high alkalinity cements, and the like, and any combination thereof. In some embodiments, a cementing fluid may comprise an aqueous liquid, a hydraulic cement, and a particulate suspending agent.

Weighting agents suitable for use in conjunction with the particulate suspending agents of the present invention may, in some embodiments, be any known weighting agent that is a particulate including, but not limited to, barite, hematite, manganese tetraoxide, galena, silica, siderite, celestite, ilmenite, dolomite, calcium carbonate, and the like, and any combination thereof.

Proppants suitable for use in conjunction with the particulate suspending agents of the present invention may, in some embodiments, be any known proppant including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and the like, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and the like, and any combination thereof.

Fine aggregate particulates suitable for use in conjunction with the particulate suspending agents of the present invention may, in some embodiments, include, but are not limited to, fly ash, silica flour, fine sand, diatomaceous earth, lightweight aggregates, hollow spheres, and the like, and any combination thereof.

Aqueous fluids suitable for use in conjunction with the particulate suspending agents of the present invention may, in some embodiments, comprise fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the compositions or methods of the present invention.

In some embodiments, treatment fluids comprising particulate suspending agents of the present invention may have a pH of about 5 or greater. In some embodiments, treatment fluids comprising particulate suspending agents of the present invention may have a pH ranging from a lower limit of about 5, 6, 7, or 8 to an upper limit of about 12, 10, or 8, and wherein the pH value may range from any lower limit to any upper limit and encompass any subset therebetween.

Treatment fluids described herein may, in some embodiments, include, but are not limited to, cementing fluids, spacer fluids, drilling fluids, fracturing fluids, lost circulation fluids, and kill pills. As referred to herein, the term "spacer fluid" should be understood to mean a fluid placed within a wellbore to separate fluids, e.g., to separate a drilling fluid within the wellbore from a cementing fluid that will subsequently be placed within the wellbore. As used herein, the term "kill pill" refers to a pill that when implemented prevents the influx of formation fluids into the wellbore and the loss of wellbore fluids to the formation while the well is open. As used herein, a "pill" is a type of relatively small volume of specially prepared treatment fluid placed or circulated in the wellbore.

In some embodiments, a particulate suspending agent may be included in a first fluid that is placed in a wellbore and/or subterranean formation before and/or after a second fluid, wherein the second fluid comprises a plurality of particulates and the particulate suspending agent. In some embodiments, the concentration of particulate suspending agent may be different in a first fluid than in a second fluid. In some embodiments, the first fluid may be a spacer fluid and the second fluid may be a treatment fluid.

The teachings of the present invention and the methods and compositions of the present invention may be used in many different types of subterranean treatment operations. Such operations include, but are not limited to, casing operations, plugging operations, drilling operations, lost circulation operations, completion operations, and water-blocking operations. In some embodiments, the suspending aid of the present invention may be used as a secondary gelling agent in a high-temperature fracturing treatment. The methods and compositions of the present invention may be used in large-scale operations or pills.

By way of nonlimiting example, a spacer fluid may, in some embodiments, comprise a base fluid, a plurality of particulates (e.g., weighting agents), and a particulate suspending agent described herein. Some embodiments may involve introducing the spacer fluid into a wellbore between two other fluids (e.g., between a cement slurry and a drilling fluid). Some embodiments may further involve allowing the cement slurry to set within at least a portion of the wellbore. Using the particulate suspending agent may, in some embodiments, advantageously mitigate particulate settling from the spacer fluid, which in turn may mitigate density changes in the spacer fluid that could lead to mixing of the spacer fluid with two other fluids.

By way of another nonlimiting example, a drilling fluid may, in some embodiments, comprise a base fluid, a plurality of particulates (e.g., weighting agents), and a particulate suspending agent described herein. Some embodiments may involve drilling at least a portion of a wellbore penetrating a subterranean formation with the drilling fluid. Using the particulate suspending agent may, in some embodiments, advantageously mitigate particulate settling from the drilling fluid.

By way of yet another nonlimiting example, a fracturing fluid may, in some embodiments, comprise a base fluid, a plurality of particulates (e.g., weighting agents and/or proppant particles), and a particulate suspending agent described herein. Some embodiments may involve introducing the fracturing fluid into a wellbore penetrating a subterranean formation at a pressure sufficient to create or extend at least one fracture in the subterranean formation. Using the particulate suspending agent may, in some embodiments, advantageously mitigate particulate settling from the fracturing fluid, which may enable a more uniform proppant placement operation.

In some embodiments, a particulate suspending agent may be used in a wellbore and/or subterranean formation with a bottom hole static temperature (BHST) ranging from a lower limit of about 150° F., 175° F., 200° F., 225° F., 275° F., 300° F., 325° F., 350° F., or 400° F. to an upper limit of about 500° F., 450° F., or 400° F., and wherein the temperature may range from any lower limit to any upper limit and encompass any subset between the upper and lower limits.

It should be understood that the compositions and methods provided herein are applicable to wellbores at any angle including, but not limited to, vertical wells, deviated wells, highly deviated wells, horizontal wells, and hybrid wells comprising sections of any combination of the aforementioned wells. As used herein, the term "deviated wellbore" refers to a wellbore or portion thereof that is oriented between about 55-degrees and about 125-degrees from a vertical inclination. As used herein, the term "highly deviated wellbore" refers to a wellbore or portion thereof that is oriented between about 75-degrees and about 105-degrees off-vertical. In some embodiments, a particulate suspending agent may be advantageously used in a wellbore that is deviated or highly deviated so as to minimize particulate settling along the cross-section of the wellbore.

In some embodiments, a particulate suspending agent of the present invention may be provided in wet or dry form. In some embodiments, a particulate suspending agent of the present invention may be added to a treatment fluid on-site or off-site of the wellbore location.

In some embodiments, crosslinked polymer particulates of a particulate suspending agent of the present invention may be produced by providing an oil solution comprising an oil-based solvent and a surfactant; providing a monomer mixture comprising an aqueous liquid and the monomers and the crosslinkers needed for a desired crosslinked polymer particulate; forming an inverse suspension with the monomer mixture and the oil solution; and reacting a free-radical initiator with the monomer mixture in the inverse suspension to form a crosslinked polymer particulate. Without being limited by theory or mechanism, it is believed that as a crosslinked polymer forms in the inverse suspension, it generates crosslinked polymer particulates. In some embodiments, a crosslinked polymer particulate may be isolated by a method including, but not limited to, drying either by water-miscible solvent extraction or azeotropic distillation; followed by filtration or centrifugation to remove the oil-based solvent. Alternatively, the crosslinked polymer particulate may be isolated from the oil-based solvent before drying with air. One skilled in the art, with the benefit of this disclosure, will recognize suitable procedural variations, including order of addition, to achieve the desired crosslinked polymer particulate. For example, when reacting the free radical initiator with the monomer mixture, the free radical initiator may be added to the monomer mixture shortly before forming the inverse emulsion, to the oil solution before forming the inverse suspension, to the inverse suspension, or any combination thereof.

In some embodiments, crosslinked polymer particulates of a particulate suspending agent of the present invention may be produced by providing an oil solution comprising an oil-based solvent and a surfactant; providing a monomer mixture comprising an aqueous liquid and the monomers for a desired polymer of the crosslinked polymer particulate; forming an inverse suspension with the monomer mixture and the oil solution; and reacting a free-radical initiator with the monomer mixture in the inverse suspension to form polymer particulates. The polymer particulates may extracted (or isolated) by a method including, but not limited to, drying either by water-miscible solvent extraction or azeotropic distillation; followed by filtration or centrifugation to remove the oil-based solvent. Alternatively, the polymer particulates may be isolated from the oil-based solvent before drying with air. The isolated polymer particulates may then be contacted with a solution that comprises an orthoester crosslinker described herein and is substantially free of water. The orthoester crosslinker may diffuse into the polymer and crosslink the polymer so as to yield crosslinked polymer particulates that are, in some embodiments, suitable for use in particulate suspending agents of the present invention. For example, an acrylic acid copolymer particulate may be produced and then treated with an orthoester crosslinker (e.g., 2-(5-amino-1,3-dioxan-2-yloxy)triethoxy-1,3-dioxan-5-ylamine) that absorbs into the particulate and crosslinks the acrylic acid copolymer.

Suitable oil-based solvents may include, but are not limited to, paraffinic hydrocarbons, aromatic hydrocarbons, olefinic hydrocarbons, petroleum distillates, synthetic hydrocarbons, and any combination thereof. Examples of a suitable oil-based solvent include ESCAID® (a low viscosity organic solvent, available from ExxonMobil, Houston, Tex.). Suitable surfactants may include, but are not limited to, a HYPERMER® (a nonionic, polymeric surfactant, available from Croda, Edison, N.J.), block copolymers of ethylene oxide and propylene oxide, block copolymers of butylene oxide and ethylene oxide, sorbitan esters, copolymers of methacrylic acid and C12-C18 alkyl methacrylates, alkylarylsulfonate salts, and any combination thereof. Suitable free radical initiators may be any water-soluble free radical initiator including, but not limited to, persulfate salts, organic peroxides, organic hydroperoxides, azo compounds (e.g., 2,2'-azobis(2-amidinopropane)dihydrochloride), and any combination thereof. One skilled in the art with the benefit of this disclosure will recognize the plurality of applicable oil-based solvents, surfactants, and free radical initiators and the appropriate concentrations of each needed for producing a crosslinked polymer particulate.

The exemplary particulate suspending agents disclosed herein may directly or indirectly affect one or more components or pieces of equipment associated with the preparation, delivery, recapture, recycling, reuse, and/or disposal of the disclosed particulate suspending agents. For example, the disclosed particulate suspending agents may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary particulate suspending agents. The disclosed particulate suspending agents may also directly or indirectly affect any transport or delivery equipment used to convey the particulate suspending agents to a well site or downhole such as, for example, any transport vessels, conduits, pipelines, trucks, tubulars, and/or pipes used to fluidically move the particulate suspending agents from one location to another, any pumps, compressors, or motors (e.g., topside or downhole) used to drive the particulate suspending agents into motion, any valves or related joints used to regulate the pressure or flow rate of the particulate suspending agents, and any sensors (i.e., pressure and temperature), gauges, and/or combinations thereof, and the like. The disclosed particulate suspending agents may also directly or indirectly affect the various downhole equipment and tools that may come into contact with the chemicals/fluids such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising an aqueous liquid, a plurality of particulates, and a particulate suspending agent, wherein the particulate suspending agent comprises a crosslinked polymer particulate formed by a reaction comprising a first monofunctional monomer and an orthoester crosslinker, the orthoester crosslinker comprising an orthoester linkage and at least two crosslinking moieties; and
   placing the treatment fluid in a wellbore penetrating a subterranean formation.

2. The method of claim 1, wherein the treatment fluid is a spacer fluid.

3. The method of claim 1, wherein the treatment fluid has a pH between about 5 and about 8.

4. The method of claim 1, wherein the treatment fluid has a pH of about 8 or greater.

5. The method of claim 1, wherein the plurality of particulates comprise at least one selected from the group consisting of a hydraulic cement, a weighting agent, a proppant, a fine aggregate particulate, and any combination thereof.

6. The method of claim 1, wherein the subterranean formation is about 150° F. to about 500° F.

7. The method of claim 1, wherein the crosslinked polymer particulate begins to degrade and dissolve above about 150° F.

8. The method of claim 1, wherein the first monofunctional monomer comprises a monomer selected from the group consisting of acrylamide, an N-substituted acrylamide, an N,N-disubstituted acrylamide, an N-vinylamide, an N-alkyl-N-vinylamide, N,N-dimethylacrylamide, sodium 2-acrylamido-2-methylpropanesulfonate, 2-acrylamido-2-methylpropanesulfonic acid, N-(hydroxymethyl)acrylamide, N-(hydroxyethyl)acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, N-vinylacetamide, acrylic acid, sodium 4-styrenesulfonate, vinylsulfonic acid, and any derivative thereof.

9. The method of claim 1, wherein the orthoester crosslinker is present in the reaction at about 0.1% to about 20% by weight of total monomer.

10. The method of claim 1, wherein the reaction further comprises a second monofunctional monomer, wherein the second monofunctional monomer and the first monofunctional monomer are different.

11. The method of claim 10, wherein the weight ratio of the first monofunctional monomer to the second monofunctional monomer in the reaction ranges from about 0.1:99.9 to about 99.9:0.1.

12. A treatment fluid comprising:
    an aqueous fluid,
    a plurality of particulates, and
    a particulate suspending agent comprising a crosslinked polymer particulate, wherein the crosslinked polymer particulate is produced from a reaction comprising:
    a first monofunctional monomer, and
    an orthoester crosslinker that comprises an orthoester linkage and at least two crosslinking moieties.

13. The treatment fluid of claim 12, wherein the plurality of particulates comprise at least one selected from the group consisting of a hydraulic cement, a weighting agent, a proppant, a fine aggregate particulate, and any combination thereof.

14. The treatment fluid of claim 12, wherein the reaction further comprises a second monofunctional monomer, wherein the first monofunctional monomer and the second monofunctional monomer are different.

15. The treatment fluid of claim 12, wherein the treatment fluid has a pH between about 5 and about 8.

16. A method comprising:
    providing a treatment fluid comprising an aqueous liquid, a plurality of particulates, and a particulate suspending agent, wherein the particulate suspending agent comprises a crosslinked polymer particulate that comprises a polymer crosslinked with an orthoester crosslinker that comprises an orthoester linkage and at least two crosslinking moieties;
    placing the treatment fluid in a wellbore penetrating a subterranean formation with a bottom hole static temperature of about 150° F. or greater; and
    allowing the orthoester linkage to degrade thereby allowing at least some of the polymer to dissolve and suspend the particulates.

17. The method of claim 16, wherein the treatment fluid is selected from the group consisting of a cement slurry, a flush fluid, a spacer fluid, and a fracturing fluid.

18. The method of claim 16, wherein the polymer comprises a first monofunctional monomer that comprises a monomer selected from the group consisting of acrylamide, an N-substituted acrylamide, an N,N-disubstituted acrylamide, an N-vinylamide, an N-alkyl-N-vinylamide, N,N-dimethylacrylamide, sodium 2-acrylamido-2-methylpropanesulfonate, 2-acrylamido-2-methylpropanesulfonic acid, N-(hydroxymethyl)acrylamide, N-(hydroxyethyl)acrylamide, methacrylamide, N-vinylformamide, 1-vinyl-2-pyrrolidinone, N-vinylcaprolactam, N-acryloyl morpholine, N-methyl-N-vinylacetamide, N-isopropylacrylamide, N,N-diethylacrylamide, N-vinylacetamide, acrylic acid, sodium 4-styrenesulfonate, vinylsulfonic acid, and any derivative thereof.

19. The method of claim 16, wherein the treatment fluid has a pH between about 5 and about 8.

20. A method of producing a particulate suspending agent, the method comprising:
 providing an oil solution comprising an oil-based solvent and a surfactant;
 providing a monomer mixture comprising an aqueous liquid and a first monofunctional monomer;
 forming an inverse suspension with the monomer mixture and the oil solution;
 reacting the monomer mixture in the inverse suspension with a free-radical initiator to form a polymer particulate;
 isolating the polymer particulate; and
 diffusing an orthoester crosslinker into the polymer particulate so as to form a crosslinked polymer particulate.

* * * * *